United States Patent [19]

Tuusa

[11] Patent Number: 5,038,244
[45] Date of Patent: Aug. 6, 1991

[54] DEVICE FOR OVERVOLTAGE PROTECTION OF A RECTIFIER BRIDGE FEEDING A D.C. MOTOR AND FOR CONTROL OF THE D.C. MOTOR DURING EMERGENCY BRAKING

[75] Inventor: Heikki J. Tuusa, Tampere, Finland
[73] Assignee: Kone Elevator GmbH, Baar, Switzerland
[21] Appl. No.: 460,786
[22] Filed: Jan. 4, 1990

[30] Foreign Application Priority Data

Mar. 14, 1989 [FI] Finland .................... 891199

[51] Int. Cl.⁵ ............................. H02H 9/04
[52] U.S. Cl. ...................... 361/56; 361/18; 361/86; 361/91; 363/55
[58] Field of Search .......... 361/18, 33, 56, 54, 361/86, 91, 111; 363/52, 55, 58, 50

[56] References Cited

U.S. PATENT DOCUMENTS

| | | | |
|---|---|---|---|
| 4,331,994 | 5/1982 | Wirth | 361/56 |
| 4,482,854 | 11/1984 | Kawada et al. | 361/56 |
| 4,545,464 | 10/1985 | Nomura | 363/55 |
| 4,843,533 | 6/1989 | Roof et al. | 363/55 |

Primary Examiner—Todd E. DeBoer
Attorney, Agent, or Firm—Sughrue, Mion, Zinn, Macpeak and Seas

[57] ABSTRACT

A device for overvoltage protection of a rectifier bridge feeding a d.c. motor and implemented using fully gate-controlled solid-state switches without zero diodes, and for control of the d.c. motor during emergency braking is disclosed. To protect at least the switches of the rectifier bridge against overvoltages and to control the d.c. motor during emergency braking, the device incorporates a capacitor connected via diodes both to the d.c. circuit and the a.c. circuit and, connected in parallel with said capacitor, a series cirucit of a fully gate-controlled solid-state switch and a resistor, said solid-state switch being controlled by a control unit in such manner that, when the voltage between at least two connections in the a.c. or d.c. circuit rises above the voltage across the capacitor, the solid-state switch turns on when said voltage between the connection rises above the excitation value and turns off when it falls below the turn-off value, and that during emergency braking the solid-state switch is turned on.

13 Claims, 4 Drawing Sheets

5,038,244

DEVICE FOR OVERVOLTAGE PROTECTION OF A RECTIFIER BRIDGE FEEDING A D.C. MOTOR AND FOR CONTROL OF THE D.C. MOTOR DURING EMERGENCY BRAKING

BACKGROUND OF THE INVENTION

1. Field Of The Invention

The present invention relates to a device for overvoltage protection of a rectifier bridge feeding a d.c. motor and implemented using fully gate-controlled solid-state switches without zero diodes, and for control of the d.c. motor during emergency braking.

2. Description Of Related Prior Art

In current practice, overvoltage protection of rectifier bridges and control of d.c. motors during emergency braking are implemented separately. Especially when an elevator has to be stopped in an emergency, the braking must be performed as independently as possible, without regard to the rest of the elevator system. Often official safety regulations prescribe the use of electric braking. Electric braking is currently achieved by connecting a braking resistor to the motor terminals either by means of an electromechanical switch or thyristors. One solution is proposed in FI patent publication 76226. The braking torque is proportional to the current flowing in the circuit, i.e. it depends on the terminal voltage of the motor and the total resistance of the braking circuit. In other cases, the braking is effected using a mechanical brake only.

SUMMARY OF THE INVENTION

The object of the invention is to achieve a centralized unit for overvoltage protection and emergency braking. The device of the invention is characterized in that, to protect at least the fully gate-controlled solidstate switches of the rectifier bridge against overvoltages and to control the d.c. motor during emergency braking, the device incorporates a capacitor connected via diodes to both the d.c. circuit and the a.c. circuit and, in parallel with said capacitor, a series circuit of a fully gate-controlled solid-state switch and a resistor, said solid-state switch being controlled by a control unit in such manner that, when the voltage between at least two connections in the a.c. or d.c. circuit rises above the capacitor voltage, the solid-state switch turns on when said voltage between the connections rises above the excitation value and turns off when it falls below the turn-off value, said values being dependent on the peak value of the main voltage and higher than it, and that during emergency braking the solid-state switch is turned on.

The invention allows the overvoltage protection system of the rectifier bridge of a d.c. drive to be used as an electric brake, obviating the need for a separate braking unit or additional components. As the device can take the required energy from the capacitor of the unit, it is always able to function independently of external voltages, e.g. in an emergency braking situation, when the voltage across the motor terminals is sufficient to enable the control unit to obtain the required energy via the supplying resistor. The relevant limit value of the terminal voltage can be determined by appropriate selection of the size of resistance employed.

BRIEF DESCRIPTION OF THE DRAWINGS

Further objects, features and advantages will become apparent to those skilled in the art from the following description thereof—when taken in conjunction with the accompanying drawings, in which.

DESCRIPTION OF PREFERRED EMBODIMENTS

In the present context, the designation "rectifier bridges employing fully gate-controlled power components without zero diodes" refers to bridges whose action is such that no zero diodes can be connected in parallel with the fully gate-controlled switching components, i.e. switches that are fired and turned off by a gate control signal (e.g. GTO thyristors and power transistors), or in which the action of parasitic zero diodes is prevented by means of other components connected in series with the switching components. An example of such a bridge is the two-quadrant or four-quadrant PWM rectifier bridge B2 shown in FIG. 3, consisting of fully gate-controlled solid-state switches K1–K6. The d.c. circuit comprises a filtering choke L. PWM control is applied in order to minimize the harmonics both on the side of the d.c. motor M and on the side of the mains L1, L2 and L3. It is characteristic of such bridges that when the flow of the current in the d.c. circuit is interrupted e.g. as a result of the protective action or an error in the control, the rather large inductance of said circuit tends to generate an overvoltage transient, against which the bridge components have to be protected. Due to the large inductances and intermediate circuit currents, the protection circuit has to be capable of absorbing fairly large amounts of energy.

Figure 1:
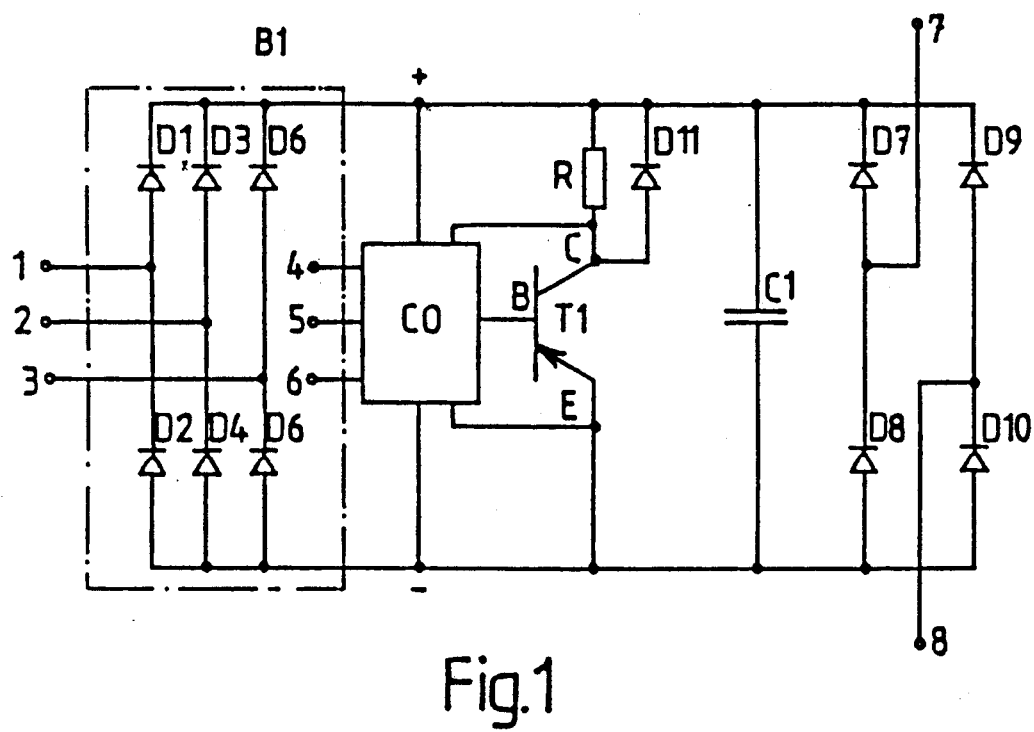
FIG. 1 represents an embodiment of a unit for overvoltage protection and emergency braking.
Figure 2:
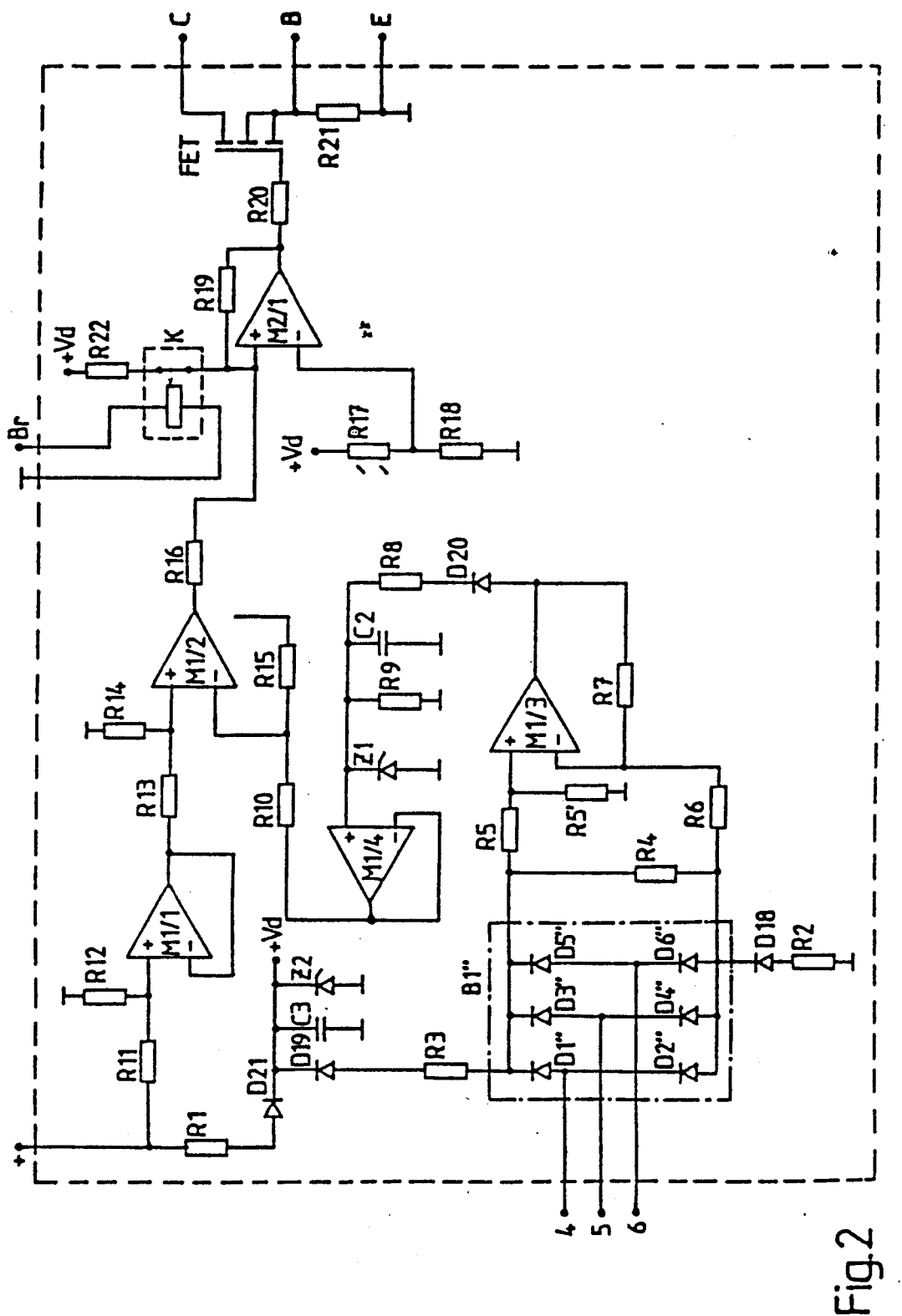
FIG. 2 represents an embodiment of the unit controlling the overvoltage protection.
Figure 3:
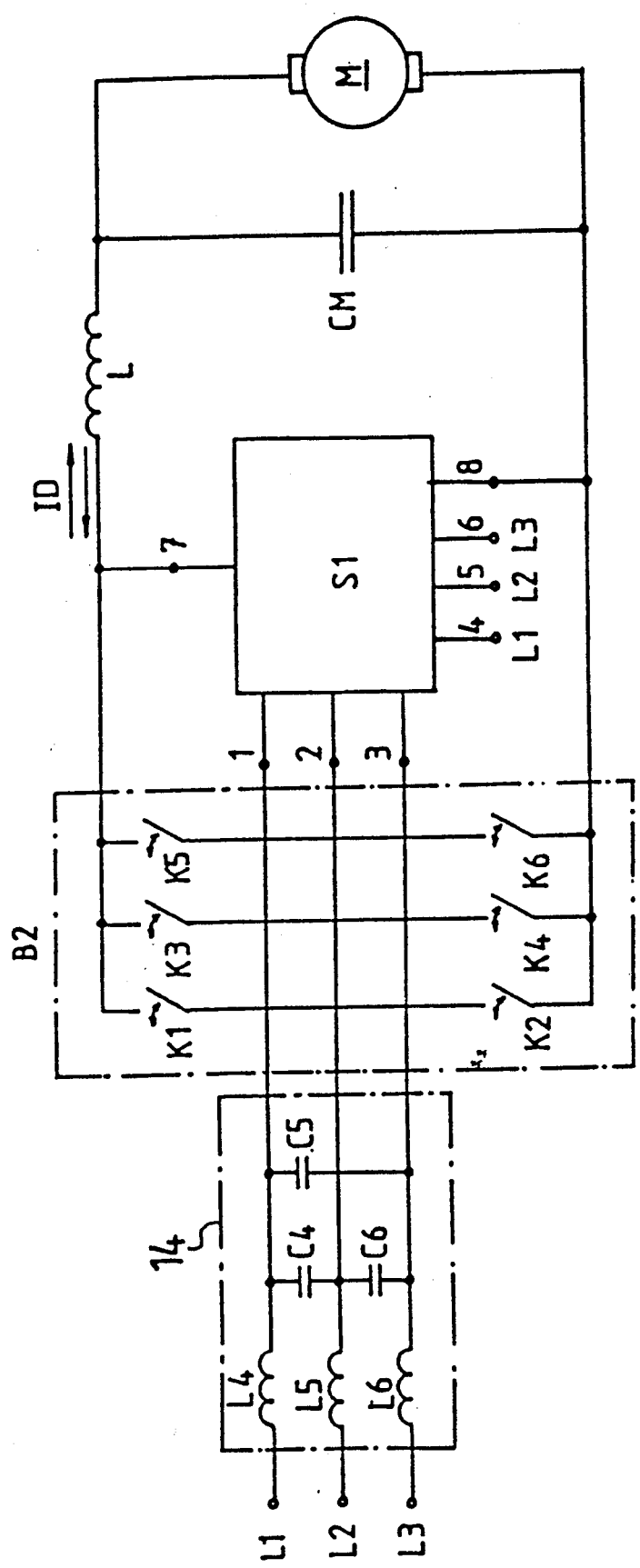
FIG. 3 represents a rectifier and a d.c. motor circuit using the unit for overvoltage protection and emergency braking (S1).

FIG. 1 shows the basic structure of the centralized unit S1 of the invention for overvoltage protection and emergency braking presented in FIG. 3. Connectors 1–3 are connected to the rectifier bridge B1, which comprises diodes D1–D6. Connector 7 is connected to a point between a diode D7 connected to the positive terminal of the d.c. circuit and a diode D8 connected to the negative terminal. Connector 8 is similarly connected between diodes D9 and D10. Transistor T1 is controlled by a control unit CO constructed as shown in FIG. 2.

A characteristic feature of the unit S1 is that the overvoltage protection function is activated when the voltage between any two of the connections 1–3 or 7–8 rises above the voltage across the capacitor C1. Transistor T1, connected in parallel with capacitor C1, turns on when the voltage across the capacitor C1 of the unit rises above the excitation value and turns off when the voltage falls below the turn-off value. Use of a hysteresis comparator M2/1 results in the former value being somewhat higher than the latter value, as is typical of this kind of two-state control. The turn-on limit of transistor T1 is always somewhat higher than the peak value of the main voltage of the mains supply. This is implemented using a control circuit as shown in FIG. 2, in which the peak value of the main voltage among the mains terminals 4–6 is measured by means of a diode bridge B1″, which consists of diodes D1″–D6″, and a differential amplifier M1/3 and the resistors R5, R5′, R6, R7 associated with it. Resistor R4 keeps the diode bridge continuously in the conducting state. The voltage is passed through diode D20 and resistor R8 into capacitor C2, which is connected in parallel with resistor R9 and Zener diode Z1, which limits the maximum value of this reference voltage to the value permitted by the bridge.

This voltage is then passed via a voltage follower M1/4 and a resistor R10 to another differential amplifier M1/2, which produces the difference between this voltage and the voltage across capacitor C1 as measured by amplifier M1/1 and resistors R11 and R12. Resistors R10 and R13-R15 are connected to the differential amplifier M1/2 to produce the difference. This difference is passed via resistor R16 to the comparator M2/1, the negative input from which is fed by a voltage produced from the voltage +Vd by means of resistors R17 and R18. Feedback occurs via resistor R19, and when the difference increases beyond the excitation value, the comparator is activated and, via R20, turns on the FET controlling the protector transistor T1, which is therefore also turned on, the collector C, base B and emitter E of transistor T1 being shown in FIG. 2. The emitter and base of T1 are separated by a resistor R21 to enable the transistor to turn off faster. The energy of capacitor C1 is then discharged into the power resistor R, connected in parallel with a protective diode D11, until the state of the hysteresis comparator M2/1 changes.

The circuit responsible for the electric braking function consists of the motor M, the filtering inductance L, the bridge formed by diodes D7-D10, the discharging resistor R and transistor T1. When transistor T1 is turned on, these components provide a path for the braking current regardless of the polarity of the motor voltage. During emergency braking, the control voltages to the components of bridge B2 are removed, so that this circuit is the only route available.

The energy required by the control circuit is taken either from the protector circuit capacitor C1 via pull-up resistor R1 and diode D21 or from the mains via diode bridge B1" by means of resistors R2 and R3 and diodes D18 and D19. The supply voltage +Vd is obtained from the terminals of capacitor C3 and stabilized by Zener diode Z2.

Referring to FIGS. 1 and 3, the device for overvoltage protection and emergency braking S1, shown in FIG. 1 is connected as shown in FIG. 3 bridge S1, shown in FIG. 1 is connected as shown in FIG. 3 feeds a d.c. motor M, which is connected in series with an inductance L and in parallel with a capacitor CM. When the mains voltage is switched on, capacitor C1 is charged to the maximum value of the main voltage of the mains supply. When the voltage between two or more of the connections 1, 2, 3, 7 and 8 exceeds the capacitor voltage, the current will flow through capacitor C1 and the forward-connected diodes in the connection branches in question. The current will flow through the capacitor until the transistor is turned on. In this manner, a path is always provided for the current when the voltage across any component in the main circuit rises above the normal level. A characteristic feature of the unit in FIG. 1 is that its action is independent of the polarity of the voltage between the terminals 1, 2, 3, 7, 8. Thus it is suited for use with bridges in which the branch current Id of the main circuit can flow in both directions as indicated by the arrows.

The circuit in FIG. 2 has a separate control connection for the braking function. The braking control signal Br is active when in the low state. In this condition, through switch K and resistor R22, the positive input of comparator M2/7 will rise above the negative input regardless of the output of amplifier M1/2. The output of comparator M2/1 therefore goes high and the discharging transistor T1 is forced to turn on. When the braking control signal Br is high, switch K is open. The fact that the control signal Br is active when in the low state guarantees that the braking is automatically activated in the event of malfunction (when the supply of auxiliary voltages to the drive is interrupted or when the control signal is lost.) Since the zero-voltage rail of the control units is connected to the unit's negative rail, the external braking control signal normally has to be electrically separated from the control unit. This can be effected by using an electro-mechanical or optical switch K. This switch may also be an element that directly recognizes the occurrence of emergency braking, e.g. a relay or an opening auxiliary contact of the main contactor. The main contactor, not shown in the figures, is a device used for on/off switching of the main supply 1,2, 3 in FIG. 1 and L11, L2, L3 in FIGS. 3 and 4.

Also whenever the supply voltages to the drive are lost, the braking function is activated since there is not low limit (output of voltage follower M1/4) to the reference voltage measured from the mains. In other words, when the supply voltages are lost, the output of M1/4 falls to zero, which means that transistor T1 conducts and dynamic braking is on until the motor speed and the corresponding terminal voltage have fallen to the hysteresis limit of the protector.

Since the unit can take its energy from the unit's capacitor C1, it will function e.g. during braking independently of external voltages whenever the speed and terminal voltage of the motor are sufficient.

Figure 4:
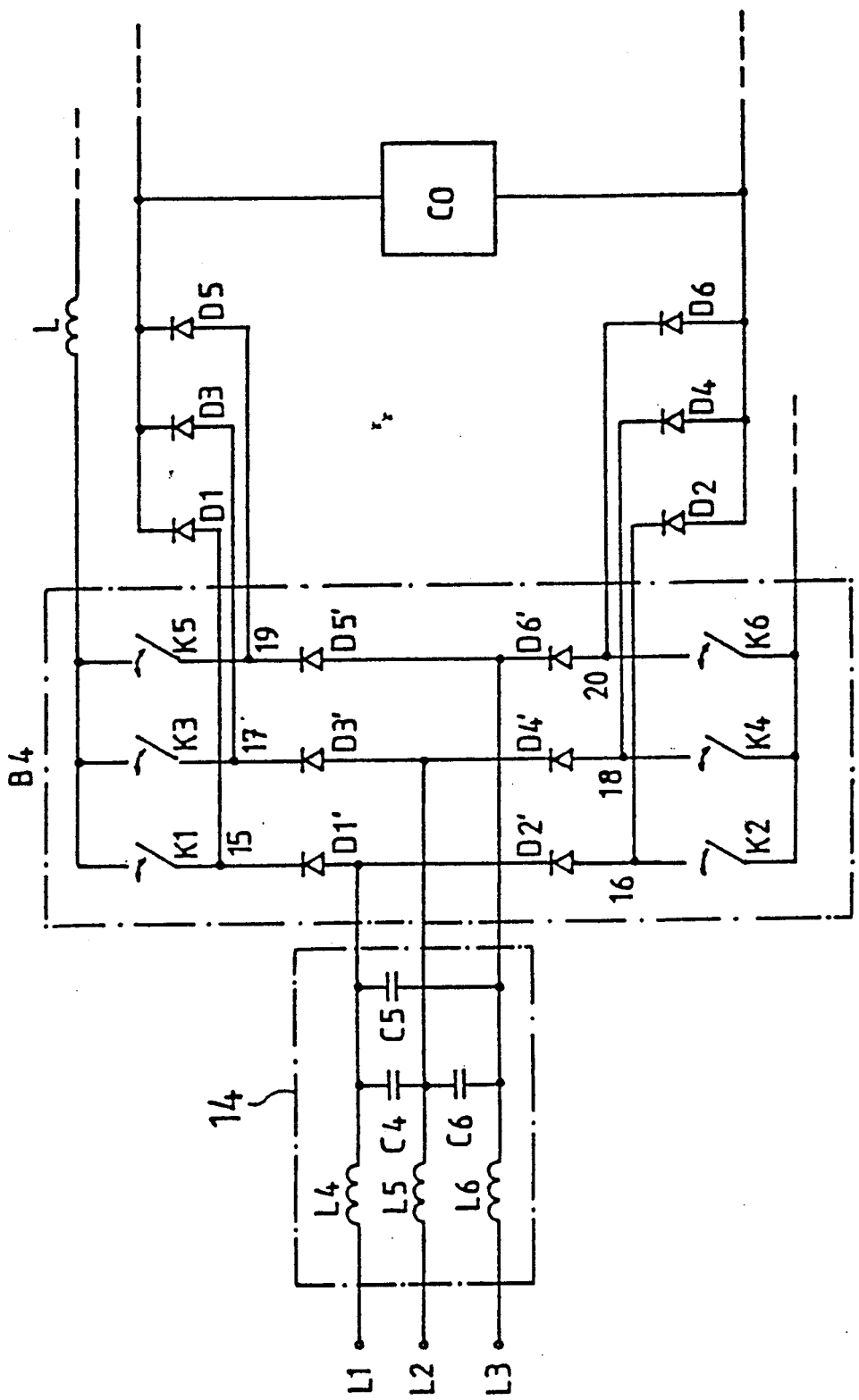
FIG. 4 shows an example of how the overvoltage protection unit may be connected to the main circuit.

For instance in the case of the two-quadrant bridge shown in FIG. 4, the overvoltage protection system protects both the switching components K1-K6 themselves and the diodes D1'-D6' connected in series with them. If only the switching components are to be protected, then the diodes D1-D6 of the protector's diode bridge have to be connected to points 15-20 between the main circuit diodes and switches as shown in FIG. 4, in which case the bridge of the overvoltage protector unit consists of the main circuit diodes D1'-D6' and the unit's diodes D1-D6.

It will now be obvious to those skilled in the art that different embodiments of the invention are not restricted to the examples described above, but may instead be varied within the scope of the following claims. For example, each branch of the diode bridge may consist of several diodes in parallel, and several capacitors may also be connected in parallel. The combined overvoltage protection and braking resistor as provided by the invention may also be used in connection with other types of rectifier bridge besides those represented by FIGS. 3 and 4.

I claim:

1. A device for overvoltage protection of a rectifier bridge feeding a d.c. motor and implemented using fully gate-controlled solid-state switches without zero diodes, and for control of said d.c. motor during emergency braking, to protect at least switches of said rectifier bridge against overvoltages and to control said d.c. motor during emergency braking, said device comprising a capacitor connected via diodes to both a d.c. circuit and an a.c. circuit and, in parallel with said capacitor, a series circuit of a fully gate-controlled solid-state switch and a dissipating resistor, said fully gate-controlled solid-state switch being controlled by a control unit in such manner that: when the voltage between at least two connections in the a.c. or d.c. circuit rises above the voltage across the capacitor, said fully gate-controlled solid-state switch turns on when said voltage between the connections rises above an excitation value and turns off when it falls below a turn-off value, said excitation value and said turn-off value being dependent on the peak value of the main voltage and higher than it; and during emergency braking said fully gate-controlled solid-state switch turns on.

2. A device according to claim 1, comprising a bridge, consisting of diodes and connected to said a.c. circuit via a.c. connections and also comprising at least a set of diodes connecting each of said device d.c. poles to at least one of the terminals of said d.c. circuit via d.c. connections.

3. A device according to claim 1 or 2, wherein said control unit comprises at least one supplying resistor, purposed to supply energy to said control unit from said capacitor and means purposed to take energy from said a.c. circuit.

4. A device according to claim 1 wherein said control unit comprises a diode bridge and a differential amplifier unit purposed to measure the peak value of the main voltage, a Zener diode purposed to limit the reference voltage thus produced, another differential amplifier unit to produce a difference between said reference voltage and the voltage measured between the terminals of said capacitor and a comparator unit purposed to be activated and hence to turn on said fully gate-controlled solid-state switch when said difference exceeds said excitation value, so that said capacitor is discharged into said dissipating resistor.

5. A device according to claim 2 wherein said control unit comprises a diode bridge and a differential amplifier unit purposed to measure the peak value of the main voltage, a Zener diode purposed to limit the reference voltage thus produced, another differential amplifier unit to produce a difference between said reference voltage and the voltage measured between the terminals of said capacitor and a comparator unit purposed to be activated and hence to turn on said fully gate-controlled solid-state switch when said difference exceeds said excitation value, so that said capacitor is discharged into said dissipating resistor.

6. A device according to claim 4, wherein said comparator unit comprises a hysteresis comparator such that said excitation value is higher than said turn-off value.

7. A device according to claim 5, wherein said comparator unit comprises a hysteresis comparator such that said excitation value is higher than said turn-off value.

8. A device according to claim 4, further comprising an emergency braking switch purposed to control said fully gate-controlled solid-state switch so as to keep it in a conducting state during emergency braking when a braking control signal is active.

9. A device according to claim 5, further comprising an emergency braking switch purposed to control said fully gate-controlled solid-state switch so as to keep it in a conducting state during emergency braking when a braking control signal is active.

10. A device according to claim 8, wherein said emergency braking switch is purposed to pass a control voltage via a resistor to said comparator unit.

11. A device according to claim 2, wherein at least one of said switches of said rectifier bridge is purposed to pass a control voltage via a resistor to said comparator unit.

12. A device according to claim 1, wherein said control unit causes said fully gate-controlled solid-state switch to turn on when supply voltages are removed.

13. A device according to claim 2, wherein said control unit causes said fully gate-controlled solid-state switch to turn on when supply voltages are removed.

* * * * *